Oct. 15, 1968　　　P. O. SKOOG　　　3,405,746
PLYWOOD PANEL PATCHING APPARATUS
Filed May 27, 1966　　　3 Sheets-Sheet 1
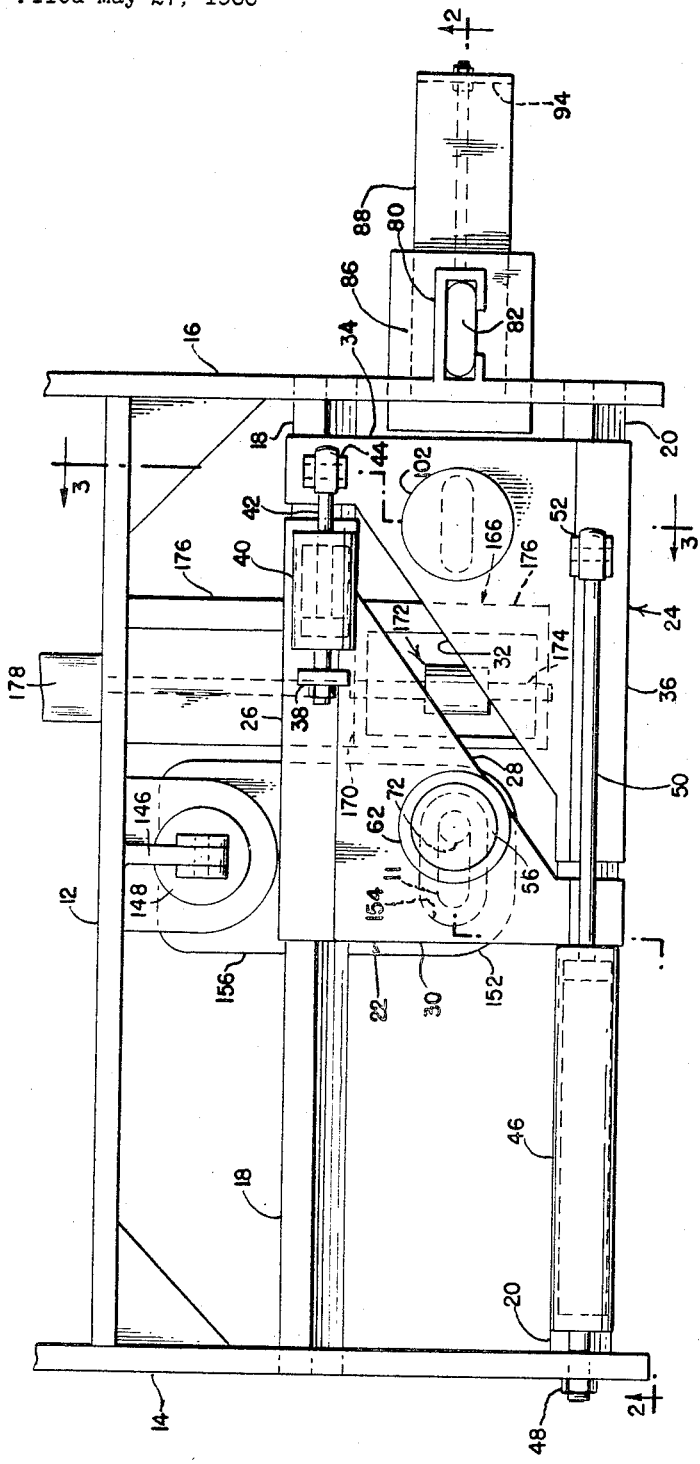
FIG—1
PER O. SKOOG
INVENTOR.
BY *Graybeal, Cole & Barnard*
ATTORNEYS

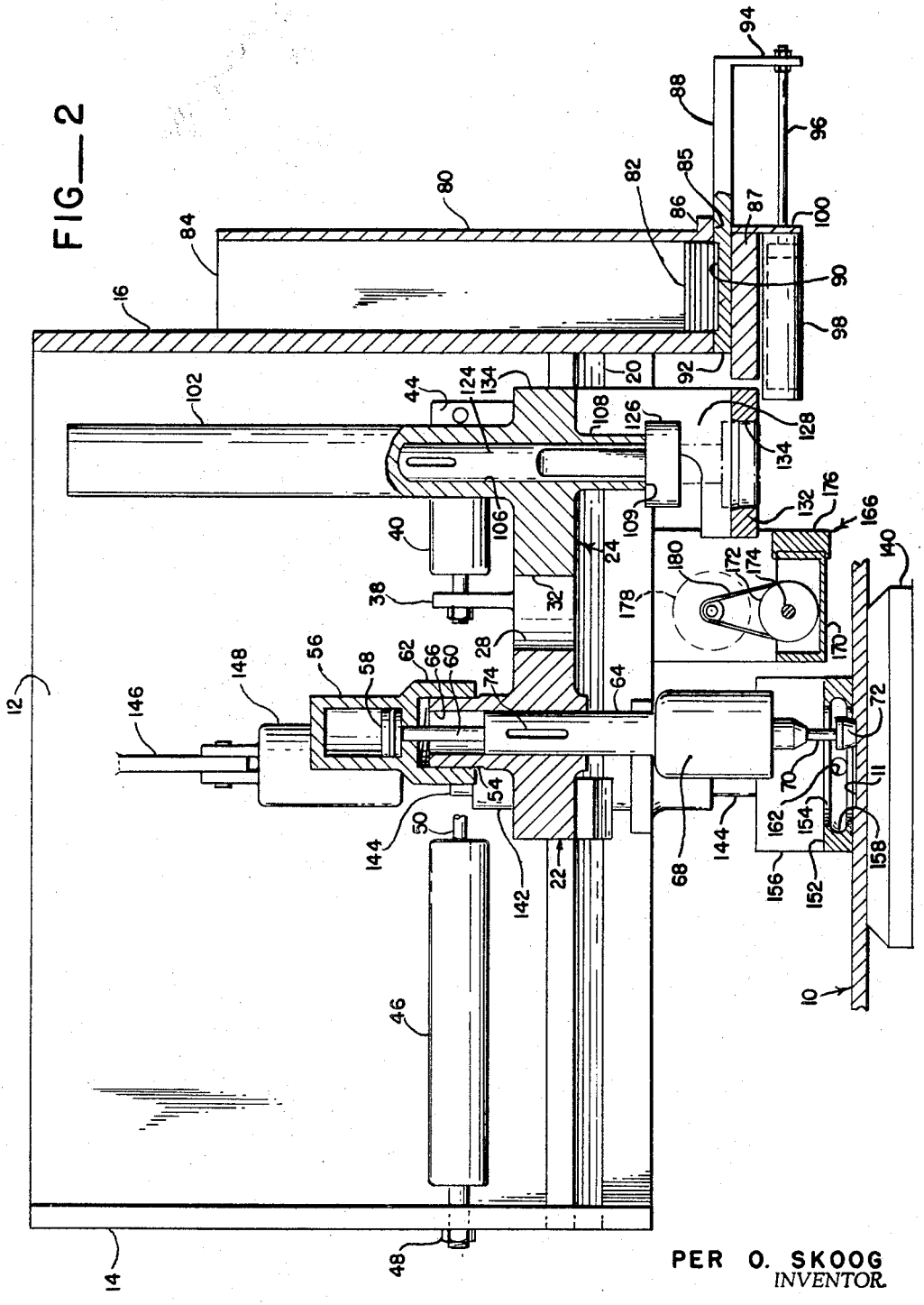

Oct. 15, 1968  P. O. SKOOG  3,405,746
PLYWOOD PANEL PATCHING APPARATUS
Filed May 27, 1966  3 Sheets-Sheet 3
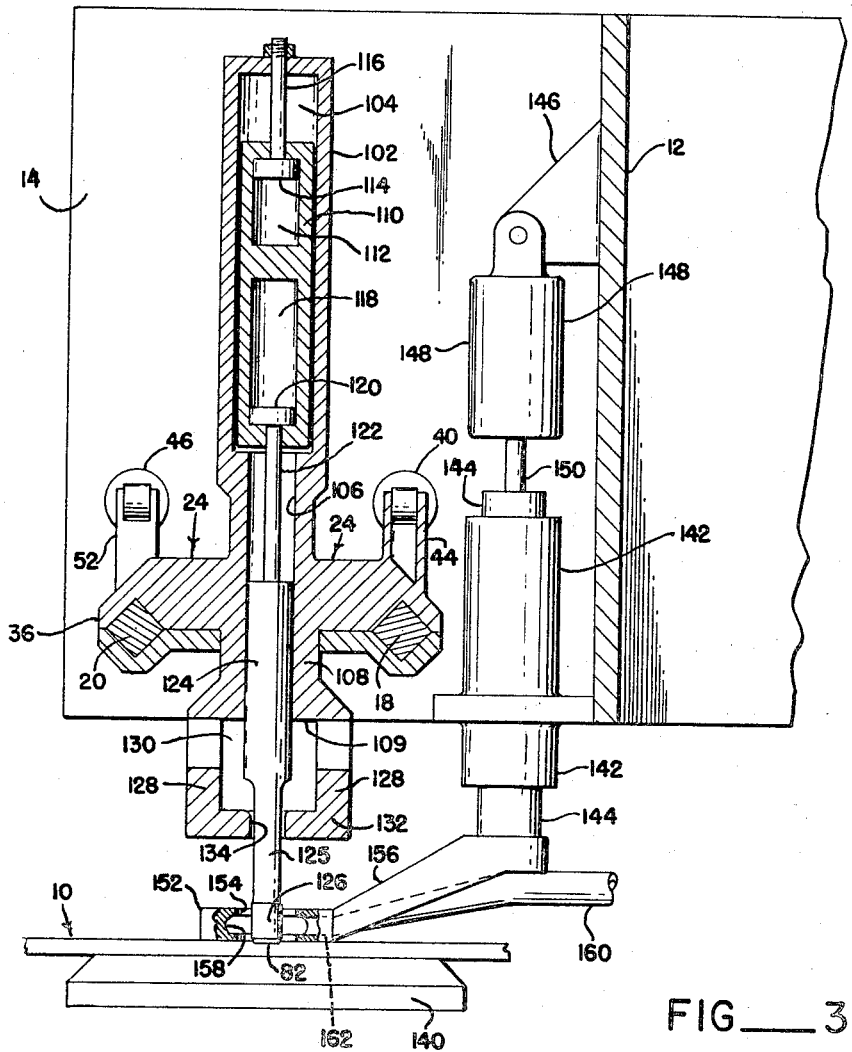
FIG__3
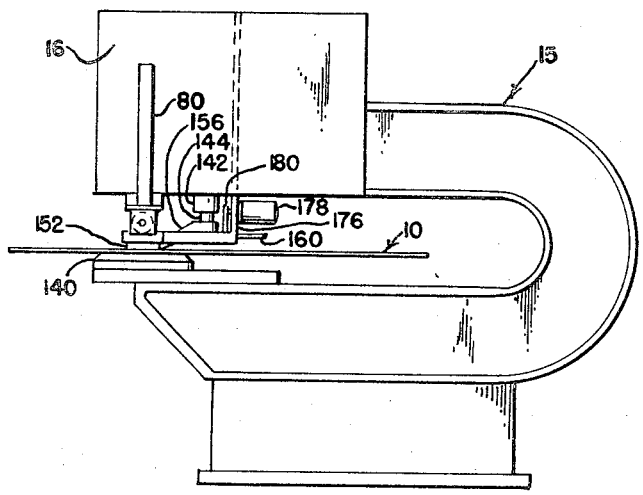
FIG__4
PER O. SKOOG
INVENTOR.
BY
ATTORNEYS

United States Patent Office 3,405,746
Patented Oct. 15, 1968

3,405,746
PLYWOOD PANEL PATCHING APPARATUS
Per O. Skoog, Olympia, Wash., assignor to The Coe Manufacturing Company, Painesville, Ohio, a corporation of Ohio
Filed May 27, 1966, Ser. No. 553,417
12 Claims. (Cl. 144—2)

This invention relates to an improved apparatus for patching plywood panels, and more particularly does it pertain to a plywood panel patching apparatus which removes defects in the outer ply or laminate of a plywood panel and which inserts in the recess left by the removed defect a preformed patch to which has been applied an adhesive material for securing it in place.

Those conversant with the plywood industry are aware of the extremely slow, inefficient and consequently costly labor involved in manual patching of assembled plywood panels. The industry has turned to machine patching not only to give more consistent and uniform patching but also to escape the adverse economics of manual labor. Much effort has been involved in devising machines which accomplish various single steps in the patching process. Some have been directed to patching boards, and some to patching a single veneer; others have been concerned only with forming patches, or merely cutting out the defective area in a sheet, panel, or veneer. Also, prior art devices have been directed to making the patch.

A principal feature of this invention, therefore, is to provide a panel patching apparatus which eliminates costly hand labor.

Another feature of this invention is to furnish a plywood panel patching apparatus having a high speed operational sequence involving the removal of defects in the outer ply by the formation of a recess into which is inserted a preformed patch of a size and shape consistent with the dimensions of the recess.

Yet another feature of this invention is to supply a plywood panel patching apparatus which during the sequence of operation applies an adhesive to the under surface of the patch for securing it in place in the recess.

Still another feature of this invention is to provide a plywood panel patching apparatus with a unique carriage system for synchronizing formation of the recess with the readying of a patch for insertion into the recess.

A further feature of this invention is the provision of a plywood panel patching apparatus which incorporates a holding feature in conjunction with the patch carrying element for preventing lateral movement and therefore misalignment of the patch as it is transferred over an adhesive applicator into position for insertion into its recess.

A further feature of this invention is to supply a plywood panel patching apparatus which is unique in design, economical to manufacture, reliable, and which also performs a complete patching operation in approximately three to four second cycles or sequences.

These, and other features, objects, and advantages which will become subsequently apparent reside in the details of construction and operation as more fully herein and after described and claimed. Reference will be had to the accompanying drawings, forming a part hereof, wherein like numerals refer to like parts throughout, and in which:

FIG. 1 is a top plan view showing particularly details of the dual or split carriage arrangement for carrying the working elements;

FIG. 2 is a front elevational view partially in cross-section taken along the line 2—2 of FIG. 1 and showing further details of the arrangement of elements;

FIG. 3 is a side elevational view taken along the line 3—3 of FIG. 1 showing the patching foot in its fully extended position for inserting a patch in a recess; and FIG. 4 is an illustrative side elevational view showing generally the supporting structure to which the invention may be attached.

Referring now to the drawings, it will be seen that a stationary frame supporting structure for the invention is provided by a generally vertically disposed back plate 12 shown to be rectangular to the ends of which are attached vertically disposed end plates 14 and 16. Extending between end plates 14 and 16 are two generally parallel spaced apart guide bars, namely inside guide bar 18 and outside guide bar 20. Guide bars 18 and 20 are rigidly supported in the end plates with their longitudinal axes lying generally in the same horizontal plane. Slidably supported on carriage guide gars 18 and 20 are a router carriage generally designated by the number 22 and a patching carriage generally designated by the number 24. Carriages 22 and 24 are of the so-called three point suspension type. The carriages together form a substantially rectangular combination structure split generally diagonally so as to form two independent but co-acting elements each of which is roughly triangular in plan view configuration. Router carriage 22 is mounted substantially over its entire length on inner carriage guide bar 18 as along frame side 26 and has diagonal or intermediate edge 28 and transverse edge 30. In this way carriage 22 has a single point supported on outside guide bar 20. In like manner patching carriage 24 has an intermediate or diagonal edge 32, transverse edge 34 and outer edge 36. Since the intermediate or diagonal edges 28 and 32 of the two carriages are spaced apart thus leaving space therebetween, the carriages as formed are not precisely triangular. Those skilled in the art will appreciate that exact configuration is not critical. While the carriages are independent they are interconnecting for coaction in moving the working parts throughout the proper sequence of operations.

On router carriage 22 is an upstanding cylinder support bracket 38 which is attached to carriage 22 near inner edge 26. A cylinder 40 is attached to bracket 38 with piston rod 42 of said cylinder connected to upstanding bracket 44 located on carriage 24 above guide bar 18. Cylinder 40 provides a proper movement to carriage 22 to move router cutter 72 through its required travel to form a recess 11 in panel 10. Stops, not shown, will be employed to impose exact limits on carriage movements. In like manner a cylinder 46 is attached to frame end plate 14 or other frame structures as at 48, said cylinder 46 having sufficient stroke to move both carriages so that after the routing patching carriage 24 may be moved over the recess and router carriage 22 moved away. Thus cylinder 46 is provided with piston rod 50 connected to upstanding bracket 52 located near outside edge 36 of the patching carriage. While router carriage 22 is moved by cylinder 40 in order to transfer the router bit through a predetermined distance, cylinder 46 moves both router carriage 22 and patching carriage 24 along the carriage guide bars to bring the patch inserting mechanism into vertical alignment with the recess formed by the router.

Router carriage 22 is provided with upstanding router cylinder receiving structure 54 in the form of an annular wall having external threads. Threaded onto cylinder support structure 54 is cylinder housing 56 having piston 58 and piston rod 60. The lower portion of cylinder housing 56 includes an annular or cylindrically shaped collar or sleeve 62 which is internally threaded to be received on cylinder support 54. The lower end of piston rod 60 is connected to a router guide ram 64 received in cylinder or bore 66 formed in cylinder support structure 54 and the body of carriage 22. Ram 64 has at the lower end thereof router motor 68 from the lower end of which in turn extends shaft 70 having router bit or cutter 72. The threaded cylinder support on the upper side of housing 22 allows adjustment of the depth to which the router cutter 72 will recess into a panel 10. Ram portion 64 of the router assembly is keyed against rotation as at 74. Thus the router may be vertically raised and lowered within bore or cylinder 66 without the router itself being turned.

On frame wall 16 adjacent patching carriage 24 is patch magazine 80. Magazine 80 is generally vertically disposed elongated tube which accommodates a stack or supply of preformed patches 82. Magazine 80 is designed for easy loading from top 84 and is also opened at the lower end 85 thereof so that individual patches may be fed from the bottom of the magazine stack. The bottom end of the magazine is provided with a base 86 to which a member 87 is connected in such a way that the lower end of the magazine is spaced slightly above member 87 in order to allow free movement of feed shuttle 88. Feed shuttle 88 is an elongated bar or other means capable of horizontal reciprocating movement between member 87 and the lower end 85 of magazine 80. Feed shuttle 88 has cavity 90 shaped to the dimensions of and designed to receive patches 82. Cavity 90 is located towards the inner end 92 of the feed shuttle directly under magazine 80. At the outer end of feed shuttle is a depending actuating arm 94 to which is connected piston rod 96 of cylinder 98 supported on the under side of base 86 as by bracket 100 or other conventional means.

Patching carriage 24 as can be seen by reference to FIGS. 2 and 3 contains an upstanding housing structure 102 the inside of which defines chamber 104. The housing 102 and therefore chamber 104 must accommodate a dual cylinder arrangement and for that reason the housing extends substantially above the upper surface of carriage 24. The lower end of chamber 104 is above the upper surface of carriage 24 and from the lower end of said chamber there extends a ram or cylinder bore 106 which extends downwardly through the lower portion of said housing, through the main body of the carriage and into and through a depending undercarriage portion 108. Within chamber 104 is a double acting cylinder structure 110 with short stroke piston chamber 112 and piston 114. Piston 114 has upwardly extending piston rod 116 which is connected to the enclosed top of housing 102. Cylinder structure 110 also includes a longer stroke cylinder chamber 118 having piston 120 with its piston rod 122 descending downwardly into bore 106. Piston rod 122 is connected to guide ram 124 including an extension 125 at the lower end of which is punch or vacuum patch foot 126. It will be seen from the front elevational view of FIG. 2 that the depending or undercarriage portion 108 on the underside of carriage 24 extends directly downwardly to a lower end surface 109. As will be seen from FIG. 3 however, which is looking at the patching carriage and its assembly from the magazine side, the underside of carriage 24 has two depending arms 128. The arms 128 angle outwardly beginning at the bottom end of 109 and then depend vertically to define a housing void or area 130 around ram 124 and extension 125 on the lower end of the ram. Thus lower end or offset surface 109 and the inside surface of arms 128 present a holding area closed from the front and rear but open from the sides. To the lower end of support arms 128 is attached holding die 132. The die 132 has holding cavity 134 formed substantially to the dimensions of patches 82 and patch foot 126 but obviously with some tolerance in order to allow foot 126 and patch 82 to pass through cavity 134. The upper surface of holding die 132 is generally flat and disposed substantially coplanar with the upper surface of magazine support member 87. In this way when shuttle feed 88 has received a patch 82 in cavity 90, cylinder 98 is actuated to retract piston rod 96 and thereby slide feet shuttle 88 bearing a single patch into holding area 130. It will be seen in FIG. 2 that the vacuum punch or foot 126 has been retracted to its fully withdrawn position against offset surface 109. It this way shuttle feed 88 can move directly into area 130 between arms 128 with a patch in vertical alignment with foot 126. The small cylinder 112 is actuated to extend the foot 126 downwardly and with the vacuum feature therein pick up patch 82 from the feed shuttle and to retract the foot again. The shuttle feed 88 is then withdrawn by cylinder 98 with the vacuum foot 126 holding the patch then able to move downwardly into the holding die cavity 134 as shown in dash-dot lines in FIG. 2.

It is to be appreciated that the particular arrangement or structure incorporating double cylinders on the patching carriage represents only one way of controlling vertical movements of patch foot 126. Obviously those skilled in the art may devise other means by which the desired movement and control may be imparted thereto.

The entire machine as shown pictorially in FIG. 4 may be mounted on a C-frame arrangement 15 or by some other structure for supporting the invention above panels 10. There will be provided a table or panel rest 140 for giving firm support to panels 10. Since the supporting frame is stationary a clamping arrangement is incorporated which automatically adjusts to various thicknesses of plywood panels which are being worked by the machine. A ram guide 142 which is essentially a thick walled elongated cylindrical tubular member is rigidly supported on the frame to slidably receive guide ram 144. A bracket 146 supports cylinder 148 which in turn has its piston rod 150 connected to guide ram 144. A clamping or hold down foot 152 which is a relatively thick member having router cavity 154 formed generally to the configuration of the patches but larger in dimensions is connected to clamping arm 156 connected to the lower end of ram 144. An annular groove 158 is formed around the edge of the router cavity 144 between the upper and lower surfaces of clamping foot 152. Annular groove 158 is connected to a vacuum line 160 by virtue of a passage 162 opening into groove 158 and extending through the body of the clamping foot to connect to vacuum line 160. In this way cuttings, shavings, and sawdust from the routing operation are quickly drawn off to thoroughly evacuate and clean the recess of loose wood and other foreign particles. The clamping arrangement described enables foot 152 to adjust to any thickness of panel being patched by this invention, since the stroke of cylinder 148 will be such as to embrace all possible thickness dimensions.

Regulation of the depth of recess 11 to which router bit 72 will cut may be by a panel contacting registry member attached to the router assembly. However, in the embodiment shown, specific reference being had to FIG. 2, the depth control or adjustment of recess 11 relies upon stroke adjustment collar or sleeve 62 received, preferably threadedly, on cylinder support structure 54. Thus, depth adjustment recess 11 is above and with respect to the router only and no other working parts are involved. In this way any requirement for vertical movement of the entire mechanism is avoided.

An adhesive applicator generally designated by the number 166 is supported on the frame in such a way as to be intermediate the transfer path of a patch held by vacuum foot 126 in its patch pickup position and the router when it is in its recess forming position. The adhesive applicator 166 is comprised of a shallow generally rectangular reservoir 170 in which is horizontally disposed an applicator roll 172 mounted on shaft 174 which in turn is supported by the walls of the reservoir. A reservoir frame holder member 176 extends rearwardly generally horizontally to attach to a portion of the permanent frame. A motor 178 is supported by member 176 and connected to shaft 174 as by a drive belt 180 or other known means to drive the applicator roll at a speed synchronized with movement of patches being transferred from the pickup station to the inserting position.

While guide bars 18 and 20 are permanently and nonmovably supported on the stationary frame structure, it should be understood that such guide bars could be disposed one above the other in a vertical plane or in a plane falling between vertical and horizontal. Thus, some alteration in carriage configuration would be necessary but the operating elements supported by the carriages would still be as shown. It should also be noted that the independent but interconnected and coacting carriage structures could be altered so that router carriage 22 would be entirely or partially supported on patching carriage 24 for slidable horizontal movement leaving said patching carriage the only one completely supported on the guide bars. In this way cylinder 40 would still interconnect the two carriages and drive the router and cylinder 46 would function to move both carriages as above stated.

In operation a panel is placed on table 140 in position so that a defect in the outer ply thereof is situated directly below the router. The operational cycle begins so that cylinder 56 is actuated to lower router cutter 72 to form recess 11. As operation is begun with the router, cylinder 98 is actuated to shuttle feed a patch 82 into the holding element area 130. Cylinder 112 is actuated to lower vacuum foot 126 which picks up patch 82 from the shuttle feed cavity. Vaccum foot 126 is then raised and the shuttle feet 88 withdrawn from the holder area and moved into the position shown in FIG. 2. Vacuum foot 126 is then lowered into the element cavity 134 to the position shown in dash-dot lines in FIG. 2 with the bottom surface of the vacuum foot being just slightly above the under surface of holder 132 to prevent lateral misalignment of the patch as it is moved across applicator roll 172. As soon as router cutter 72 is finished cutting recess 11 the router is withdrawn and cylinder 46 is actuated to transfer both carriage 22 and carriage 24. The router is transferred away from recess 11 and vacuum foot 126 is transferred over and into vertical alignment with said recess. As the transfer is being made the underside of patch 82 is drawn across adhesive applicator roll 172. Vacuum foot 126 is then lowered the rest of the distance to place patch 82 in recess 11.

It will be appreciated that numerous modifications and changes will occur to those skilled in the art, and that the embodiments shown here are merely illustrative of the principals of this invention. Accordingly, it is not desired to limit this invention to the exact construction and operation as shown and described. Hence all suitable modifications and equivalents may be reverted to which fall within the scope of the invention.

What is claimed is:

1. A patching apparatus for wood panels, comprising:
   (a) a substantially immovable supporting frame;
   (b) carriage guide means on said frame;
   (c) first and second horizontally movable, independent, interconnected and coacting carriages at least said second carriage being supported on said guide means, said first carriage including a vertically movable router and router cutter supported thereon, said second carriage including a vertically movable vacuum patch pickup and placement foot means supported thereon, said second carriage also including a patch holding element having a holding cavity in vertical alignment with and through which passes said foot means, said holding element being supported by and in spaced relation to said second carriage to define a patch receiving area over said holding element;
   (d) a patch supply magazine supported on said frame including a feed mechanism for feeding individual patches from said magazine to said area over said holding element, said foot means being movable downwardly to pick up a patch from said feed mechanism which is then withdrawn to allow said foot means to descend into said holding cavity;
   (e) a first actuating means interconnecting said first carriage and said second carriage for moving said first carriage and said router a predetermined distance relative to said second carriage;
   (f) a second actuating means secured to said supporting frame and connected to said second carriage for moving both carriages; and
   (g) actuating means on said carriages for raising and lowering said router and said vacuum foot means.

2. The patching apparatus according to claim 1 and in which said guide bars are substantially immovably supported on said supporting frame.

3. The patching apparatus according to claim 2 and in which said guide bars are disposed in a substantially horizontal plane.

4. The patching apparatus according to the structure of claim 1 and in which said foot means after obtaining a patch from said feed mechanism is designed to be lowered into said holding cavity to hold the upper surface of a patch slightly above the lower surface of said holding element to prevent misalignment of said patch on said foot means.

5. The patching apparatus according to the structure of claim 4 and in which an adhesive applicator means is stationarily supported on side frame so that as said second actuating means moves both carriages adhesive is applied to the under surface of said patch.

6. A patching apparatus for wood panels, comprising:
   (a) a stationary supporting frame, including a wood panel supporting table;
   (b) a pair of elongated, substantially horizontally disposed, spaced apart and generally parallel carriage guide bars supported on said frame above said table;
   (c) horizontally movable, independent, and coacting router and patching carriages with at least said patching carriage being supported on said guide bars, said router carriage including a vertically movable router and router cutter supported thereon, said patching carriage including a vertically movable vacuum patch pickup and placement foot means supported thereon, said patching carriage also including a patch holding element having a holding cavity in vertical alignment with and through which said foot means coacts and passes, said holding element being supported generally below and in spaced relation to said carriage by arms extending therefrom to define a patch receiving area over said holding element;
   (d) a patch supply magazine independently supported adjacent said patching carriage including a feed mechanism for feeding individual patches from said magazine to said area over said patch holding element, said foot means moving downwardly to pick up said patch from said feed mechanism which is then withdrawn to allow said foot means to descend into said holding cavity;
   (e) a first actuating means mounted on said router carriage and connected to said patching carriage for moving said router carriage a predetermined distance with respect to said patching carriage to move said router a sufficient distance to remove defects by the formation of a recess in said panel;
   (f) a second actuating means secured to said supporting frame and connected to said patching carriage for moving both carriages, including moving said router carriage away from said recess and transferring the foot means on said patching carriage over said recess; and
   (g) actuating means on said carriages for raising and lowering said router and said vacuum foot means.

7. The patching apparatus according to the structure of claim 6 and in which said foot means after obtaining a patch from said feed mechanism is designed to be lowered into said holding cavity to hold the upper surface of a patch slightly above the lower surface of said holding element to prevent misalignment of said patch on said foot means.

8. The patching apparatus according to the structure of claim 7 and in which an adhesive applicator means is stationarily supported on said frame so that as said second actuating means moves both carriages adhesive is applied to the under surface of said patch.

9. The patching apparatus according to the structure of claim 6 and in which a clamping foot means is supported on said frame for retaining panels on said table.

10. The patching apparatus according to the structure of claim 9 and in which the depth to which said router will form a recess in a panel is controlled by adjustment means attached to said router actuating means.

11. A patching apparatus for wood panels, comprising:
  (a) a stationary supporting frame;
  (b) a pair of elongated, substantially horizontally disposed, spaced apart and generally parallel carriage guide bars supported on said frame;
  (c) first and second horizontally movable, relatively independent, interconnected, coacting carriages at least the second of which is supported on said guide bars, said first carriage including a vertically movable router and router cutter supported thereon, said second carriage including a vertically movable vacuum patch pickup and placement foot means supported thereon;
  (d) a patch supply magazine supported on said frame including a feed mechanism for feeding individual patches from said magazine to a position in vertical alignment with said foot means, said foot means moving downwardly to pick up said patch from said feed mechanism which is then withdrawn;
  (e) a first actuating means mounted on said first carriage and connected to said second carriage for moving said first carriage a predetermined distance with respect to said second carriage to allow said router to form a recess of predetermined size and configuration in a panel;
  (f) a second actuating means secured to said supporting frame and connected to said second carriage for moving both carriages to transfer said router away and to transfer said foot means over said recess;
  (g) actuating means on said carriages for raising and lowering said router and said vacuum foot means; and
  (h) adhesive applicator means stationarily supported on said frame and disposed between said router and foot means so that as transfer is made adhesive will be applied to the under side of said patch held by said foot means.

12. The patching apparatus according to the structure of claim 11 and in which the depth to which said recess is formed by said router is controlled by adjustment connected to said router and router actuating means.

References Cited
UNITED STATES PATENTS

| | | | |
|---|---|---|---|
| 2,488,835 | 11/1949 | Skoog | 144—2 |
| 2,675,837 | 4/1954 | Mann et al. | 144—2 |
| 3,129,736 | 4/1964 | Herman | 144—2 |

WILLIAM W. DYER, Jr., *Primary Examiner.*

W. D. BRAY, *Assistant Examiner.*